E. A. WOOD.
Pressure Gage.

No. 102,350. Patented April 26, 1870.

Witnesses.
Pierrepont Bartow
William H. Fisher

Inventor.
Edwin A. Wood

United States Patent Office.

EDWIN A. WOOD, OF UTICA, NEW YORK.

Letters Patent No. 102,350, dated April 26, 1870; antedated March 19, 1870.

IMPROVEMENT IN PRESSURE-GAUGES.

The Schedule referred to in these Letters Patent and making part of the same.

*To all whom it may concern:*

Be it known that I, EDWIN A. WOOD, of the city of Utica, in the county of Oneida and in the State of New York, have invented an improved Pressure-Gauge, of which the following is a specification.

Nature and Objects of my Invention.

The first part of my invention relates to a gauge-case with apertures constructed in such a manner that the gauge-spring and the movements within the gauge-case can be reached and adjusted without removing either the glass, dial, or index.

The second part of my invention relates to the attachment of the yoke-frame, yoke, and capsule to the siphon, independently of the gauge-case, in such a manner that the registry of the gauge shall not be affected by any motion imparted to the siphon from expansion or other causes.

The third part of my invention relates to the combination of the lever, the spring, and a crank, in such a manner that, when the lever returns to its original position, the spring shall cause the crank and index to return to their original position, and thus prevent lost motion.

The fourth part of my invention relates to a spindle provided with a thread, and working in a nut attached to the gauge-case, and fitted in such a manner that the spindle shall be allowed to turn freely within the nut, and at the same time prevent undue lateral motion.

Description of the Accompanying Drawings.

Figure 2:
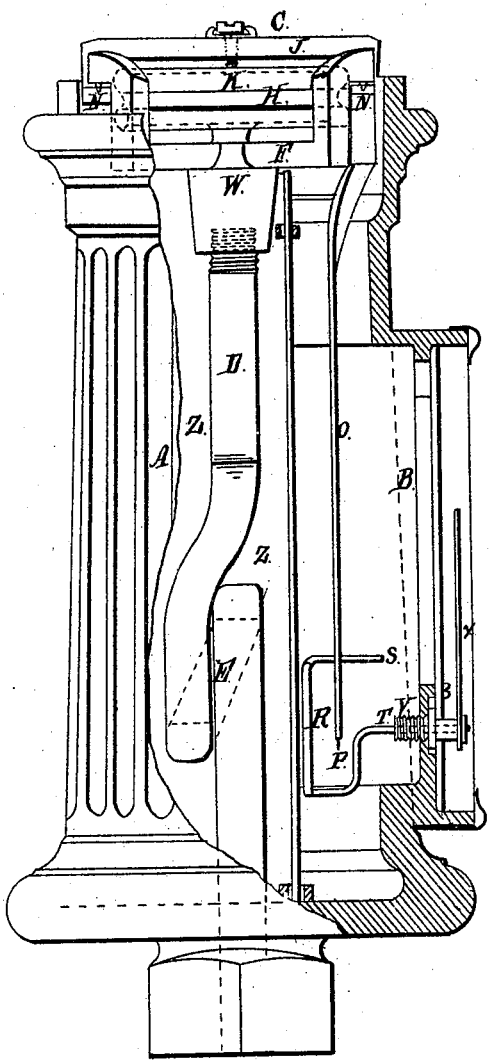
Figure 1:
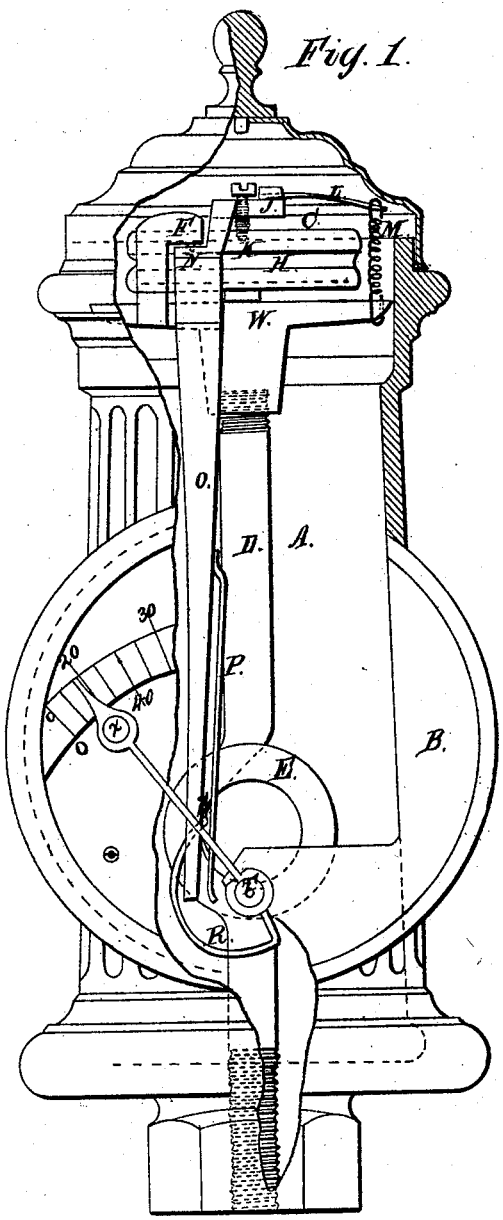

Figure 1 is a front view and section of my gauge.
Figure 2 is a side view and section of same.

General Description.

A is a cylindrical gauge-case with an opening in it at B for the dial-plate, and with an opening in its top at C for adjusting or repairing the machinery within.

D is a pipe with a siphon, E, within the gauge-case. The dead-air space around the siphon is usually sufficient to prevent the siphon from freezing, but, when necessary, I inclose the siphon in a packing of felt or other non-conductive substance Z.

F is a yoke-frame.

H is a double corrugated spring or capsule fastened upon the top of the yoke-frame.

J is a yoke, the center of which, by means of a point, K, rests upon the capsule H.

L is a spring.

M is a spiral spring attached to L, both of which are for the purpose of returning the yoke J to the capsule H when the pressure is removed.

N N are points in the yoke-frame upon which the yoke J moves.

O is a long lever attached at its upper end to the yoke, and forming a continuation of the same.

P is a spring made of any elastic substance fastened to the lever O near its top.

R is the crank, the end S of which plays in the slot formed by the lever O and the spring P, which crank is pressed by the spring close against the lever, thus preventing lost motion arising from whatever cause.

T is a spindle connected with and turned by the crank R.

V is a nut fitted into the gauge-case. Through this nut the spindle T is screwed.

X is the index fastened to the spindle T.

W is the frame or continuation of the upper end of the siphon which supports the movements placed at the said upper end of the said siphon.

Mode of Operation.

As a fair example of the manner in which my gauge operates, I will explain its mode of operation when attached to a steam-boiler.

The gauge being properly attached to the boiler, steam enters the pipe D, passes up through the siphon E, where it is condensed into water.

This water is then forced up through the pipe D by the pressure of the steam in the boiler, then through the yoke-frame F into the capsule H, filling the interior of said capsule, causing the heads of said capsule to expand, and, raising the yoke J, gives motion to the long lever O, and thus actuates the index.

When the pressure on said capsule is removed, the lever O is returned to its original position by the springs L and M, and the crank R is returned to its original position by the spring P.

Advantages.

One advantage possessed by my gauge over others is the simplicity of its construction and the consequent cheapness of its manufacture.

Another point of superiority of my gauge is the ease with which its different interior parts can be reached and adjusted.

A third advantage is that this gauge can be very closely affixed to a boiler or other vessel upon which it is to be used, because the siphon is placed within the gauge-case.

A fourth advantage is that this gauge is not affected by frost.

A fifth advantage is that, although the syphon be placed within the gauge-case, yet, by placing the capsule and movements in the upper part of the case, a proper leverage may be obtained without increasing the height of the case more than is necessary to contain the siphon.

*Claims.*

I claim—

1. The gauge-case A, with an aperture C at the top, so arranged that the works may be placed in, removed, or adjusted without removing the dial, index or glass, substantially as described and for the purposes hereinbefore mentioned.

2. The attachment of the supporting-frame W of movements directly to the upper end of the siphon when placed within the gauge-case, and the arrangement of the operating-lever O, substantially in the manner described, whereby the expansion or contraction, or other movements of the siphon are prevented from affecting the registry of the gauge, substantially as described and for the purposes hereinbefore set forth.

3. The combination of the long lever O and its spring P, and the crank R or its equivalent, in substantially the manner described and for the purposes hereinbefore mentioned.

4. The combination of the spindle T and nut V, substantially in the manner and for the purposes hereinbefore mentioned.

EDWIN A. WOOD.

Witnesses:
FREDERIC H. FANNING,
WILLIAM H. FISHER.